(12) United States Patent
Yoon et al.

(10) Patent No.: US 11,309,939 B2
(45) Date of Patent: *Apr. 19, 2022

(54) OPTIMIZED MULTI-BEAM ANTENNA ARRAY NETWORK WITH AN EXTENDED RADIO FREQUENCY RANGE

(71) Applicant: Movandi Corporation, Irvine, CA (US)

(72) Inventors: Seunghwan Yoon, Irvine, CA (US); Ahmadreza Rofougaran, Newport Beach, CA (US)

(73) Assignee: Movandi Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,520

(22) Filed: Nov. 6, 2020

(65) Prior Publication Data

US 2021/0058116 A1 Feb. 25, 2021

Related U.S. Application Data

(63) Continuation of application No. 16/675,290, filed on Nov. 6, 2019, now Pat. No. 10,951,274, which is a
(Continued)

(51) Int. Cl.
*H01Q 19/10* (2006.01)
*H04B 7/0408* (2017.01)
(Continued)

(52) U.S. Cl.
CPC ............. *H04B 7/0408* (2013.01); *H01Q 3/20* (2013.01); *H01Q 15/16* (2013.01); *H01Q 19/17* (2013.01);
(Continued)

(58) Field of Classification Search
CPC ........... H01Q 3/20; H01Q 15/16; H01Q 19/17
(Continued)

(56) References Cited

U.S. PATENT DOCUMENTS 4,799,062 A 1/1989 Sanderford et al.
6,731,904 B1 5/2004 Judd
(Continued)

FOREIGN PATENT DOCUMENTS

WO 2008027531 A3 12/2008

OTHER PUBLICATIONS

Corrected Notice of Allowability for U.S. Appl. No. 16/125,757 dated Mar. 11, 2021.
(Continued)

*Primary Examiner* — Peguy Jean Pierre
(74) *Attorney, Agent, or Firm* — Chip Law Group

(57) ABSTRACT

A system, in a radio frequency (RF) transmitter device, dynamically selects one or more reflector devices along a non-line-of-sight (NLOS) radio path based on a defined criteria. Further, the dynamically selected one or more reflector devices are controlled based on one or more conditions. In an RF receiver device, communicates with the dynamically selected one or more reflector devices comprising an active reflector device. The active reflector device comprises at least a first antenna array and a second antenna array. The first antenna array transmits a first set of beams of RF signals to at least the RF transmitter device and the RF receiver device. The second antenna array receives a second set of beams of RF signals from at least the RF transmitter device and the RF receiver device.

19 Claims, 5 Drawing Sheets

Related U.S. Application Data continuation of application No. 16/382,386, filed on Apr. 12, 2019, now Pat. No. 10,587,313, which is a continuation of application No. 15/834,894, filed on Dec. 7, 2017, now Pat. No. 10,348,371.

(51) Int. Cl.
| | | |
|---|---|---|
| H01Q 3/20 | (2006.01) | |
| H01Q 19/17 | (2006.01) | |
| H04B 7/0426 | (2017.01) | |
| H01Q 15/16 | (2006.01) | |
| H01Q 25/00 | (2006.01) | |
| H04B 7/06 | (2006.01) | |
| H04B 7/022 | (2017.01) | |

(52) U.S. Cl.
CPC ........... *H01Q 25/008* (2013.01); *H04B 7/022* (2013.01); *H04B 7/043* (2013.01); *H04B 7/0617* (2013.01)

(58) Field of Classification Search
USPC ........................................................ 343/761
See application file for complete search history.

(56) References Cited

U.S. PATENT DOCUMENTS

| | | | |
|---|---|---|---|
| 7,079,079 | B2 | 7/2006 | Jo et al. |
| 7,480,486 | B1 | 1/2009 | Oh et al. |
| 7,675,465 | B2 | 3/2010 | Doan et al. |
| 8,045,638 | B2 | 10/2011 | Grant et al. |
| 9,130,262 | B2 | 9/2015 | Park et al. |
| 9,178,546 | B1 | 11/2015 | Klemes |
| 9,277,510 | B2 | 3/2016 | Helmersson et al. |
| 10,103,853 | B2 | 10/2018 | Moshfeghi |
| 10,277,370 | B2 | 4/2019 | Moshfeghi |
| 10,320,090 | B2 | 6/2019 | Zou et al. |
| 10,355,720 | B2 | 7/2019 | Shattil |
| 10,560,179 | B2 | 2/2020 | Gharavi et al. |
| 10,854,995 | B2 | 12/2020 | Rofougaran et al. |
| 11,088,756 | B2 | 8/2021 | Gharavi et al. |
| 2004/0204114 | A1 | 10/2004 | Brennan et al. |
| 2005/0088260 | A1 | 4/2005 | Ajioka et al. |
| 2005/0136943 | A1 | 6/2005 | Banerjee et al. |
| 2006/0170595 | A1 | 8/2006 | Gustaf |
| 2006/0205342 | A1 | 9/2006 | McKay et al. |
| 2007/0127360 | A1 | 6/2007 | Song et al. |
| 2009/0092120 | A1 | 4/2009 | Goto et al. |
| 2009/0136227 | A1 | 5/2009 | Lambert |
| 2009/0156227 | A1 | 6/2009 | Frerking et al. |
| 2009/0191910 | A1 | 7/2009 | Athalye et al. |
| 2010/0265925 | A1 | 10/2010 | Liu et al. |
| 2010/0284446 | A1 | 11/2010 | Mu et al. |
| 2011/0294415 | A1 | 12/2011 | Jeon et al. |
| 2012/0003925 | A1 | 1/2012 | Coldrey et al. |
| 2012/0149300 | A1 | 6/2012 | Forster |
| 2012/0224651 | A1 | 9/2012 | Murakami et al. |
| 2013/0072112 | A1 | 3/2013 | Gunnarsson et al. |
| 2013/0072113 | A1 | 3/2013 | Lee et al. |
| 2014/0077875 | A1 | 3/2014 | Wang et al. |
| 2016/0049723 | A1 | 2/2016 | Baks et al. |
| 2016/0204513 | A1 | 7/2016 | Yemelong et al. |
| 2018/0027471 | A1 | 1/2018 | Zhang et al. |
| 2018/0063139 | A1 | 3/2018 | Day et al. |
| 2019/0020402 | A1 | 1/2019 | Gharavi et al. |
| 2019/0297648 | A1 | 9/2019 | Nagaraja et al. |
| 2019/0319756 | A1 | 10/2019 | Moshfeghi |
| 2020/0185299 | A1 | 6/2020 | Chang et al. |
| 2020/0204249 | A1 | 6/2020 | Pyun |
| 2020/0322016 | A1 | 10/2020 | Kim et al. |
| 2020/0412519 | A1 | 12/2020 | Krishnaswamy et al. |
| 2021/0109145 | A1 | 4/2021 | Haustein et al. |

OTHER PUBLICATIONS

Corrected Notice of Allowability for U.S. Appl. No. 16/204,397 dated Mar. 11, 2021.
Corrected Notice of Allowance for U.S. Appl. No. 16/204,397 dated Apr. 28, 2021.
Corrected Notice of Allowance for U.S. Appl. No. 16/354,390 dated Apr. 9, 2021.
Corrected Notice of Allowance for U.S. Appl. No. 16/364,956 dated May 6, 2021.
Corrected Notice of Allowance for U.S. Appl. No. 16/388,043 dated Apr. 15, 2021.
Corrected Notice of Allowance for U.S. Appl. No. 16/689,758 dated Apr. 29, 2021.
Corrected Notice of Allowance for U.S. Appl. No. 16/689,758 dated Apr. 7, 2021.
Corrected Notice of Allowance for U.S. Appl. No. 16/866,536 dated Apr. 29, 2021.
Corrected Notice of Allowance for U.S. Appl. No. 16/927,470 dated Apr. 26, 2021.
Final Office Action for U.S. Appl. No. 16/233,044 dated Apr. 19, 2021.
Final Office Action for U.S. Appl. No. 16/398,156 dated Apr. 19, 2021.
Non-Final Office Action for U.S. Appl. No. 17/011,042 dated Mar. 23, 2021.
Notice of Allowability for U.S. Appl. No. 16/129,413 dated Feb. 18, 2021.
Notice of Allowability for U.S. Appl. No. 16/388,043 dated Mar. 11, 2021.
Notice of Allowability for U.S. Appl. No. 16/819,388 dated Apr. 28, 2021.
Notice of Allowability for U.S. Appl. No. 16/819,388 dated Apr. 5, 2021.
Notice of Allowance for U.S. Appl. No. 16/354,390 dated Feb. 25, 2021.
Notice of Allowance for U.S. Appl. No. 16/377,847 dated Apr. 5, 2021.
Notice of Allowance for U.S. Appl. No. 16/388,043 dated May 7, 2021.
Notice of Allowance for U.S. Appl. No. 16/391,628 dated Mar. 17, 2021.
Notice of Allowance for U.S. Appl. No. 16/451,980 dated Mar. 23, 2021.
Notice of Allowance for U.S. Appl. No. 16/666,680 dated Mar. 2, 2021.
Notice of Allowance for U.S. Appl. No. 16/941,690 dated May 5, 2021.
Supplemental Notice of Allowance for U.S. Appl. No. 16/452,023 dated Feb. 18, 2021.
Supplemental Notice of Allowance for U.S. Appl. No. 16/153,735 dated Feb. 24, 2021.
Supplemental Notice of Allowance for U.S. Appl. No. 16/451,998 dated Mar. 2, 2021.
Supplemental Notice of Allowance for U.S. Appl. No. 16/452,023 dated Apr. 30, 2021.
Supplemental Notice of Allowance for U.S. Appl. No. 16/866,536 dated Mar. 17, 2021.
Notice of Allowability for U.S. Appl. No. 16/129,413 dated Jan. 6, 2021.
Corrected Notice of Allowability for U.S. Appl. No. 16/684,789 dated Jan. 11, 2021.
Corrected Notice of Allowance for U.S. Appl. No. 16/125,757 dated Dec. 31, 2020.
Corrected Notice of Allowance for U.S. Appl. No. 16/125,757 dated Feb. 1, 2021.
Corrected Notice of Allowance for U.S. Appl. No. 16/129,413 dated Nov. 27, 2020.

(56) References Cited

OTHER PUBLICATIONS

Corrected Notice of Allowance for U.S. Appl. No. 16/153,735 dated Nov. 18, 2020.
Corrected Notice of Allowance for U.S. Appl. No. 16/364,956 dated Jan. 6, 2021.
Corrected Notice of Allowance for U.S. Appl. No. 16/388,043 dated Dec. 24, 2020.
Corrected Notice of Allowance for U.S. Appl. No. 16/388,043 dated Dec. 30, 2020.
Corrected Notice of Allowance for U.S. Appl. No. 16/675,290 dated Dec. 16, 2020.
Corrected Notice of Allowance for U.S. Appl. No. 16/684,789 dated Nov. 20, 2020.
Corrected Notice of Allowance for U.S. Appl. No. 16/927,470 dated Feb. 2, 2021.
Corrected Notice of Allowance for U.S. Appl. No. 16/927,470 dated Jan. 26, 2021.
Corrected Notice of Allowance for U.S. Appl. No. 16/388,043 dated Feb. 8, 2021.
International Preliminary Report on Patentability for International Application No. PCT/US2018/064184 dated Jan. 21, 2021.
Morgan et al., "A Same-Frequency Cellular Repeater Using Adaptive Feedback Cancellation," IEEE, Mar. 12, 2012, pp. 3825-3830.
Non-Final Office Action for U.S. Appl. No. 16/377,847 dated Dec. 14, 2020.
Non-Final Office Action for U.S. Appl. No. 16/666,680 dated Nov. 13, 2020.
Non-Final Office Action for U.S. Appl. No. 16/941,690 dated Nov. 12, 2020.
Notice of Allowability for U.S. Appl. No. 15/607,750 dated Jan. 11, 2021.
Notice of Allowability for U.S. Appl. No. 16/129,413 dated Nov. 9, 2020.
Notice of Allowance for U.S. Appl. No. 16/204,397 dated Jan. 12, 2021.
Notice of Allowance for U.S. Appl. No. 16/364,956 dated Dec. 11, 2020.
Notice of Allowance for U.S. Appl. No. 16/451,998 dated Jan. 14, 2021.
Notice of Allowance for U.S. Appl. No. 16/452,023 dated Nov. 16, 2020.
Notice of Allowance for U.S. Appl. No. 16/675,290 dated Aug. 10, 2020.
Notice of Allowance for U.S. Appl. No. 16/689,758 dated Jan. 22, 2021.
Notice of Allowance for U.S. Appl. No. 16/819,388 dated Jan. 25, 2021.
Notice of Allowance for U.S. Appl. No. 16/866,536 dated Jan. 29, 2021.
Supplemental Notice of Allowability for U.S. Appl. No. 16/153,735 dated Jan. 11, 2021.
Corrected Notice of Allowance for U.S. Appl. No. 16/125,757 dated Jul. 16, 2021.
Corrected Notice of Allowance for U.S. Appl. No. 16/125,757 dated Jun. 28, 2021.
Corrected Notice of Allowance for U.S. Appl. No. 16/204,397 dated Jun. 7, 2021.
Corrected Notice of Allowance for U.S. Appl. No. 16/233,044 dated Jun. 11, 2021.
Corrected Notice of Allowance for U.S. Appl. No. 16/354,390 dated Jul. 13, 2021.
Corrected Notice of Allowance for U.S. Appl. No. 16/354,390 dated Jun. 3, 2021.
Corrected Notice of Allowance for U.S. Appl. No. 16/364,956 dated Jun. 23, 2021.
Corrected Notice of Allowance for U.S. Appl. No. 16/377,847 dated Jul. 13, 2021.
Corrected Notice of Allowance for U.S. Appl. No. 16/377,847 dated Jul. 6, 2021.
Corrected Notice of Allowance for U.S. Appl. No. 16/391,628 dated Jul. 30, 2021.
Corrected Notice of Allowance for U.S. Appl. No. 16/391,628 dated Jun. 29, 2021.
Corrected Notice of Allowance for U.S. Appl. No. 16/398,156 dated Aug. 13, 2021.
Corrected Notice of Allowance for U.S. Appl. No. 16/689,758 dated Jul. 6, 2021.
Corrected Notice of Allowance for U.S. Appl. No. 16/689,758 dated May 27, 2021.
Final Office Action for U.S. Appl. No. 17/011,042 dated Jul. 2, 2021.
Notice of Allowability for U.S. Appl. No. 16/819,388 dated May 27, 2021.
Notice of Allowance for U.S. Appl. No. 16/233,044 dated Jun. 4, 2021.
Notice of Allowance for U.S. Appl. No. 16/398,156 dated Jul. 6, 2021.
Supplemental Notice of Allowance for U.S. Appl. No. 16/451,980 dated Aug. 6, 2021.
Supplemental Notice of Allowance for U.S. Appl. No. 16/451,980 dated Jun. 30, 2021.
Supplemental Notice of Allowance for U.S. Appl. No. 16/451,980 dated May 18, 2021.
Supplemental Notice of Allowance for U.S. Appl. No. 16/451,998 dated Jun. 24, 2021.
Supplemental Notice of Allowance for U.S. Appl. No. 16/451,998 dated May 18, 2021.
Supplemental Notice of Allowance for U.S. Appl. No. 16/666,680 dated Jul. 9, 2021.
Supplemental Notice of Allowance for U.S. Appl. No. 16/666,680 dated Jun. 10, 2021.
Supplemental Notice of Allowance for U.S. Appl. No. 16/866,536 dated Jul. 21, 2021.
Supplemental Notice of Allowance for U.S. Appl. No. 16/866,536 dated Jun. 7, 2021.
Supplemental Notice of Allowance for U.S. Appl. No. 16/941,690 dated Aug. 9, 2021.
Supplemental Notice of Allowance for U.S. Appl. No. 16/941,690 dated May 18, 2021.
Corrected Notice of Allowance for U.S. Appl. No. 16/233,044 dated Sep. 10, 2021.
Corrected Notice of Allowance for U.S. Appl. No. 16/377,847 dated Aug. 20, 2021.
Corrected Noticeof Allowance for U.S. Appl. No. 16/388,043 dated Aug. 27, 2021.
Corrected Notice of Allowance for U.S. Appl. No. 16/398,156 dated Nov. 17, 2021.
Non-Final Office Action for U.S. Appl. No. 16/920,191 dated Oct. 15, 2021.
Non-Final Office Action for U.S. Appl. No. 17/011,042 dated Oct. 29, 2021.
Non-Final Office Action for U.S. Appl. No. 16/927,225 dated Dec. 22, 2021.
Non-Final Office Action for U.S. Appl. No. 16/935,422 dated Jan. 21, 2022.
Non-Final Office Action for U.S. Appl. No. 16/935,515 dated Jan. 21, 2022.
Non-Final Office Action for U.S. Appl. No. 17/337,529 dated Jan. 26, 2022.
Corrected Notice of Allowance for U.S. Appl. No. 16/920,191 dated Feb. 15, 2022.
Non-Final Office Action for U.S. Appl. No. 17/004,373 dated Feb. 15, 2022.
Non-Final Office Action for U.S. Appl. No. 17/060,182 dated Feb. 25, 2022.
Notice of Allowance for U.S. Appl. No. 16/920,191 dated Feb. 2, 2022.

OPTIMIZED MULTI-BEAM ANTENNA ARRAY NETWORK WITH AN EXTENDED RADIO FREQUENCY RANGE

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 16/675,290, filed on Nov. 6, 2019, which is a Continuation Application of U.S. patent application Ser. No. 16/382,386, filed on Apr. 12, 2019, which is a Continuation Application of U.S. patent application Ser. No. 15/834,894, filed on Dec. 7, 2017.

This Application also makes reference to:
U.S. application Ser. No. 15/607,743, filed May 30, 2017;
U.S. application Ser. No. 15/835,971, filed Dec. 8, 2017; and
U.S. application Ser. No. 15/836,198, filed Dec. 8, 2017.

Each of the above referenced Application is hereby incorporated herein by reference in its entirety.

FIELD OF TECHNOLOGY

Certain embodiments of the disclosure relate to reflector devices in a millimeter wave communication system. More specifically, certain embodiments of the disclosure relate to a method and system for an optimized multi-beam antenna array network with an extended radio frequency (RF) range.

BACKGROUND

Recent advancements in the field of RF communication network have witnessed various multipath propagation systems, such as multi-antenna array system, to enhance the capacities of radio channels. Exemplary use cases of the multi-antenna array system are beam forming and beam steering techniques, wherein an RF transmitter radiates or steers radio waves in a specific direction by adjusting amplitude and phase of a transmission signal from each of the active antennas of the multi-antenna array system. Likewise, an RF receiver receives the radio waves via each antenna element from a plane wave in only a selected direction combined coherently. Each antenna of the multi-antenna array may comprise transceiver and data converters that may be configured to handle multiple data streams and thus, may generate multiple beams simultaneously from one array. For the advanced high-performance fifth generation communication networks, such as the millimeter wave communication system, there is a demand for innovative techniques to increase coverage.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for an optimized multi-beam antenna array network with an extended RF range, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for an optimized multi-beam antenna array network with an extended RF range. In the following description, reference is made to the accompanying drawings, which form a part hereof, and in which is shown, by way of illustration, various embodiments of the present disclosure.

Figure 1:
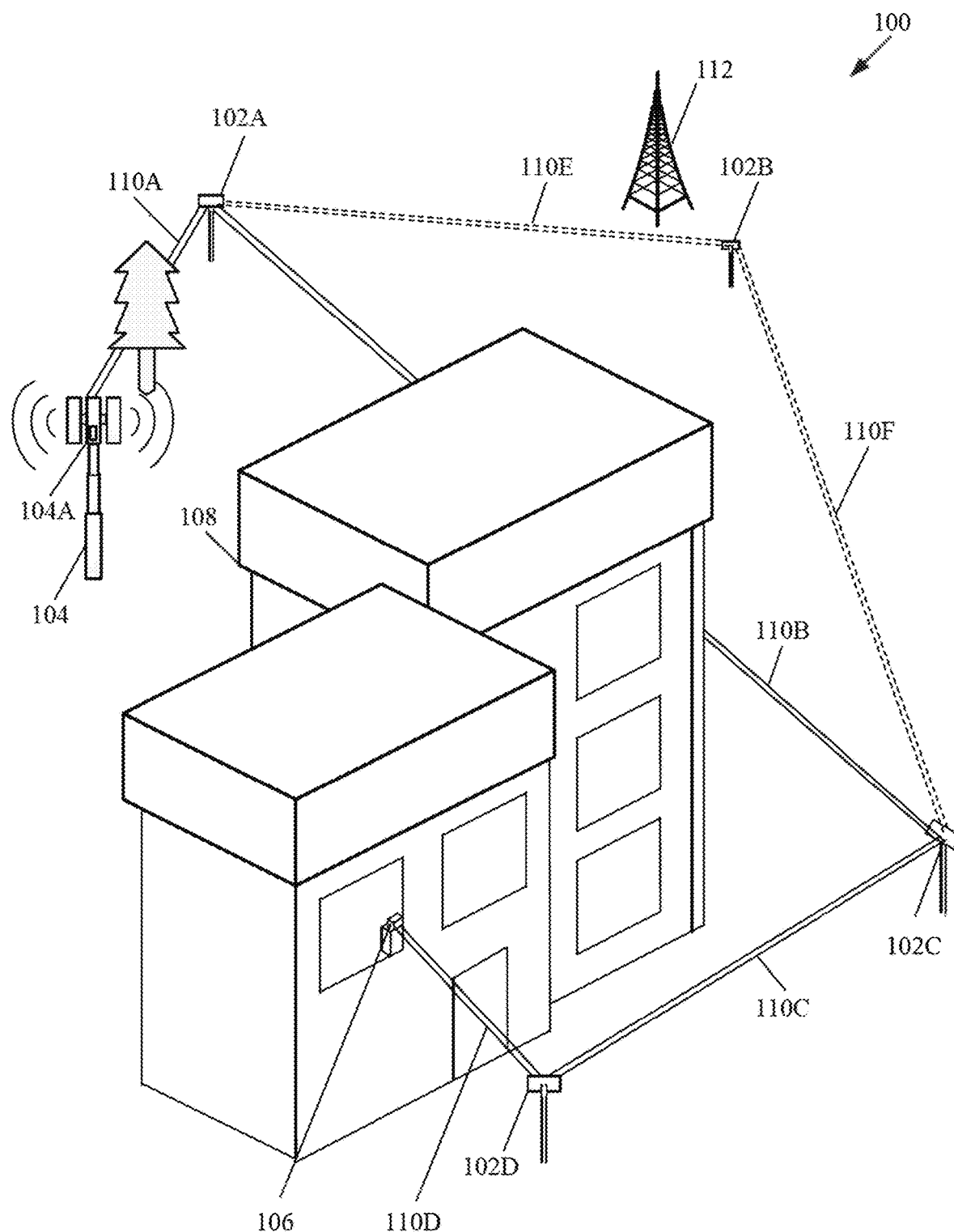
FIG. 1 is an exemplary network environment diagram, in accordance with an exemplary embodiment of the disclosure.

FIG. 1 is an exemplary network environment diagram, in accordance with an exemplary embodiment of the disclosure. With reference to FIG. 1, there is shown a network environment diagram 100 that may include a plurality of reflector devices 102. The plurality of reflector devices 102 may include at least a first active reflector device 102A, a first passive reflector device 102B, a second passive reflector device 102C, and a second active reflector device 102D. There is further shown a base station 104, a customer premises equipment (CPE) 106, and customer premises 108. There is further shown a first radio signal path 110A, a second radio signal path 110B, a third radio signal path 110C, a fourth radio signal path 110D, a fifth radio signal path 110E, and a sixth radio signal path 110F. There is further shown an external source of RF interference, such as a TV station 112.

It may be understood that there is shown only two passive reflector devices, two active reflector devices, and one external source of RF interference. However, the count of the passive reflector devices, the active reflector devices, and the external source of RF interference may vary based on various factors, such as the location of the base station 104, relative distance of the base station 104 from the CPE 106, and count and type of physical obstructing devices, without deviation from the scope of the disclosure. In accordance with an embodiment, one or more circuits of each of the plurality of reflector devices 102 may be integrated in a package of the plurality of antenna modules of the corresponding reflector device. In accordance with an embodiment, the one or more circuits of each of the plurality of reflector devices 102 may be on a printed circuit board on which the plurality of antenna modules of the corresponding reflector device are mounted.

The plurality of reflector devices 102 may include various active and passive reflector devices, such as at least the first active reflector device 102A, the first passive reflector device 102B, the second passive reflector device 102C, and the second active reflector device 102D. In accordance with an embodiment, one or more of the plurality of reflector devices 102, such as the first active reflector device 102A and the second active reflector device 102D, may comprise at least an array of distributed transmitters (or an array of distributed transceivers) that may utilize various transmission schemes, such as multiple-input-multiple-output (MIMO) transmission. In an exemplary embodiment of the disclosure, the distributed transmitters (or transceivers) in the plurality of reflector devices 102 may utilize transmit beam forming for the MIMO transmission.

The first active reflector device 102A and the second active reflector device 102D may be multi-beam active reflector devices configured to perform a plurality of operations on a plurality of beams of RF signals received from an RF transmitter device, for example the base station 104 or an access point, and the second passive reflector device 102C. Examples of such operations may include, but are not limited to, adjusting an amplitude gain, adjusting phase shift, performing beam forming to generate a plurality of beams of RF signals, and performing beam steering based on the phase shifting of the plurality of beams of RF signals to deflect the plurality of beams at a desired angle. The first active reflector device 102A and the second active reflector device 102D may require a substantial DC power for performing the above-mentioned operations. The first active reflector device 102A and the second active reflector device 102D may be positioned in a vicinity of physical obstructing objects, such as a tree and tinted glass window, respectively, that may partially block or impair the path of the plurality of beams of RF signals.

Figure 3:
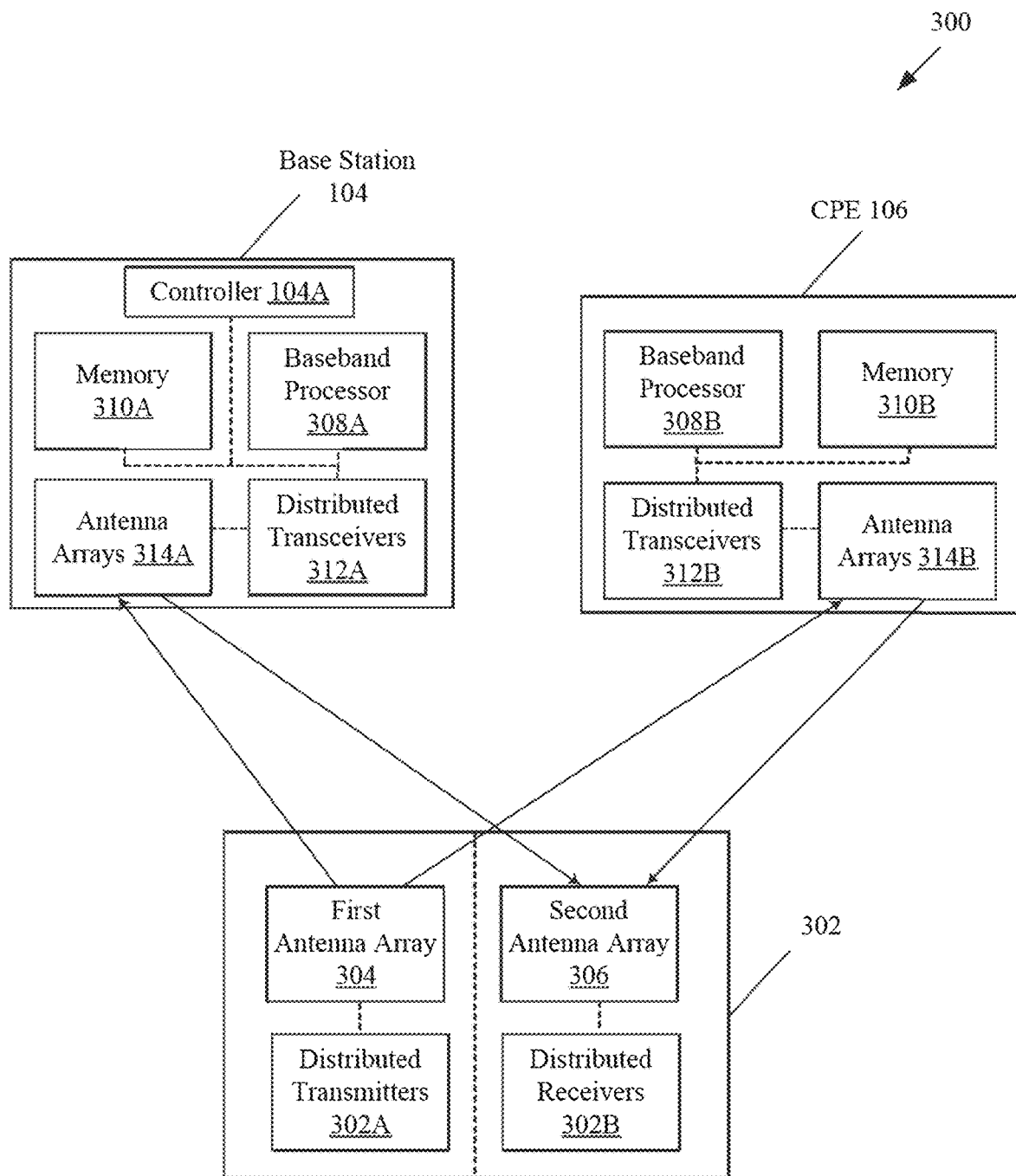
FIG. 3 illustrates a block diagram of an exemplary multi-beam active reflector device, in accordance with an exemplary embodiment of the disclosure.

Each of the first active reflector device 102A and the second active reflector device 102D may comprise a first antenna array, i.e. a transmitter array, and a second antenna array, i.e. a receiver array, as described in FIG. 3. The first antenna array may be configured to transmit a first set of beams of RF signals of the plurality of beams of RF signals to at least the RF transmitter device, for example the base station 104, and an RF receiver device, for example the CPE 106. The first antenna array may be further configured to transmit the first set of beams of RF signals to others, such as the second passive reflector device 102C, of the dynamically selected one or more reflector devices. Likewise, the second antenna array may be configured to receive a second set of beams of RF signals from the RF transmitter device and the RF receiver device. The second antenna array may be further configured to receive the second set of beams of RF signals from others, such as the second passive reflector device 102C, of the dynamically selected one or more reflector devices. In addition to the first antenna array and the second antenna array, each of the first active reflector device 102A and the second active reflector device 102D may be realized based on other components, such as a plurality of low-noise amplifiers, a plurality of phase shifters, a combiner, a splitter, a plurality of power amplifiers, and mixers. Detailed block diagram of an exemplary multi-beam active reflector device is described in FIG. 3.

The first passive reflector device 102B and the second passive reflector device 102C may be configured to provide only a deflection to the plurality of beams of RF signals without adjusting the amplitude gain and the phase shift of the plurality of beams of RF signals. The first passive reflector device 102B and the second passive reflector device 102C provide the deflection based on various parameters, such as an incident angle, scan angle, and sizes of the first passive reflector device 102B and the second passive reflector device 102C. The first passive reflector device 102B and the second passive reflector device 102C may be positioned in a vicinity of a physical obstructing object, such as a building, that may completely block the path of the plurality of beams of RF signals. The first passive reflector device 102B and the second passive reflector device 102C may be realized by a simple metal plane with a flat or a curved surface. The first passive reflector device 102B and the second passive reflector device 102C may be arranged at an incident angle, so that the angle of incoming plurality of beams of RF signals corresponds to the angle of the outgoing plurality of beams of RF signals. Detailed block diagram of an exemplary passive reflector device is described in FIG. 2.

The base station 104 is a fixed point of communication that may communicate information, in the form of the plurality of beams of RF signals, to and from a RF transmitting/receiving device, such as the CPE 106, via the dynamically selected one or more reflector devices. Multiple base stations, corresponding to one or more service providers, may be geographically positioned to cover specific geographical areas. Typically, bandwidth requirements serve as a guideline for a location of the base station 104 based on relative distance between the CPE 106 and the base station 104. The count of base stations depends, for example, on expected usage, which may be a function of population density, and geographic irregularities, such as buildings and mountain ranges, which may interfere with the plurality of beams of RF signals.

The base station 104 may comprise one or more circuits, such as a controller 104A, that may be configured to dynamically select one or more reflector devices, such as the first active reflector device 102A, the first passive reflector device 102B, the second passive reflector device 102C, and the second active reflector device 102D, from the plurality of reflector devices 102 along a non-line-of-sight (NLOS) radio path based on a defined criteria. The base station 104, in conjunction with a global positioning system (GPS) may be further configured to determine the location of the plurality of reflector devices. Other than the GPS, various other techniques, for example, global navigation satellite system (GNSS), site map, signal delay, database information, and the like may be deployed to determine the location of the plurality of reflector devices. The controller 104A may be further configured to control the dynamically selected one or more reflector devices based on one or more conditions for an optimized transmission and reception of a plurality of beams of RF signals by the selected one or more reflector devices. In accordance with an embodiment, the controller 104A in the base station 104 may enable the base station 104 to dynamically configure and manage operation of the entire distributed transceivers in each RF device in the RF device network. In such a case, the base station 104 may be referred to a master RF device. Such master RF device may be utilized to configure, control, and manage the entire distributed transceivers in the RF device network to optimize overall network performance.

Figure 2:
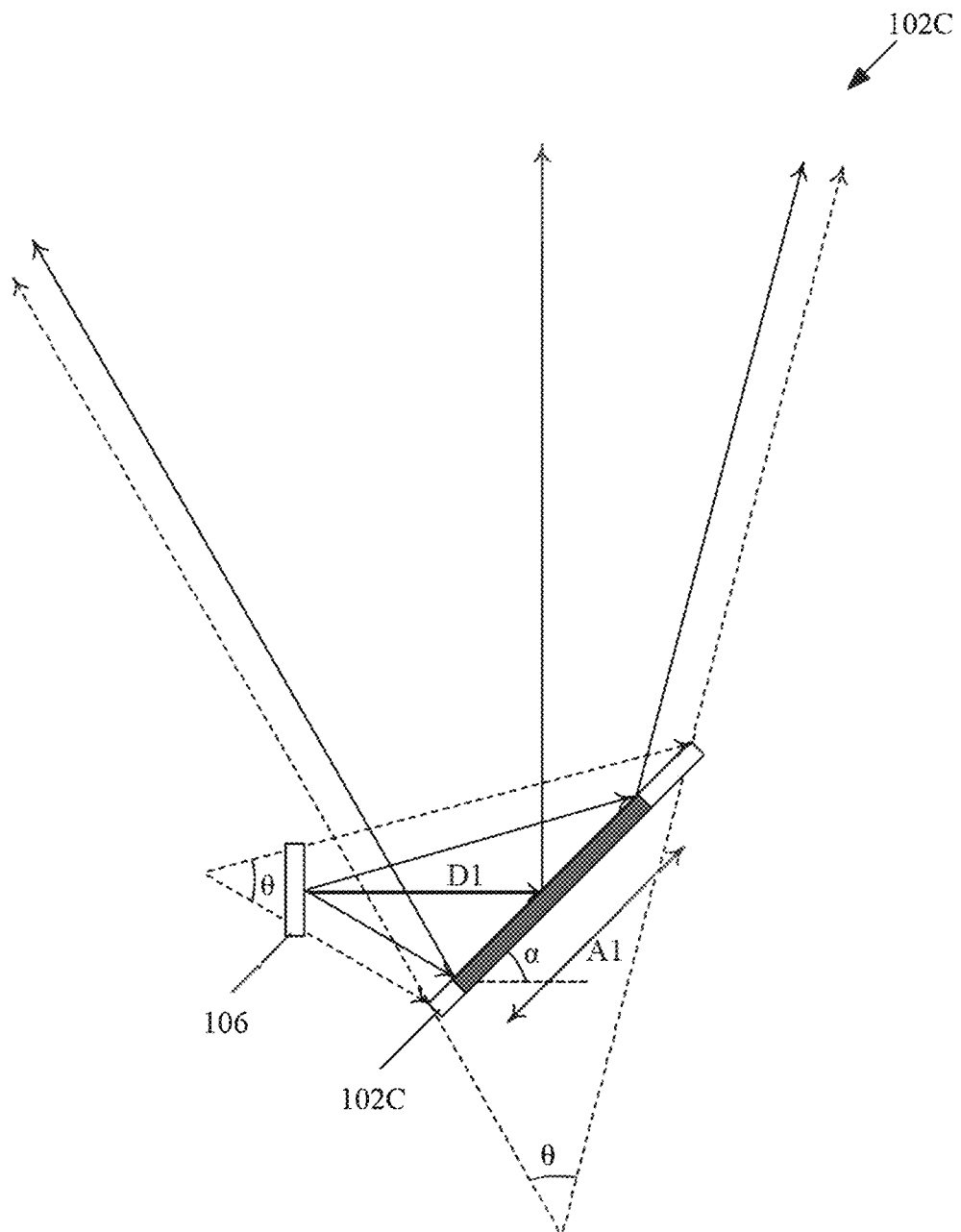
FIG. 2 illustrates an exemplary passive reflector device, in accordance with an exemplary embodiment of the disclosure.

The controller 104A may be further configured to monitor and collect RF communication environment information, such as propagation environment conditions, link quality, application device capabilities, antenna polarization, radiation pattern, antenna spacing, array geometry, transmitter/ receiver locations, target throughput, and/or application QoS requirements. The controller 104A may utilize the collected RF communication environment information to configure system, network and communication environment conditions as desired. For example, the controller 104A may perform high level system configurations, such as the number of transceivers that are activated, the number of application devices in communication, and adding/dropping application devices to the RF communication network. As shown in FIGS. 1 and 2, the controller 104A is residing in the base station 104. However, in some embodiments, the controller 104A may reside in different RF devices, such as separate network microprocessors and servers on the RF communication network. In accordance with an embodiment, the functionality of the controller 104A may be distributed over several devices in the RF communication network. The controller 104A may be further configured to manage communication sessions over the RF communication network. In this regard, the controller 104A may coordinate operation of baseband processors in the RF communication network such that various baseband processing may be split or shared among the baseband processors, as described in FIG. 3.

The CPE 106 may correspond to a telecommunication hardware located inside the customer premises 108, such as an office facility or a home space. Examples of the CPE 106 may include, but are not limited to, a home router, a cable or satellite television set-top box, a VoIP base station, or other customized hardware. In accordance with an embodiment, the CPE 106 may be a single receiving device that may receive the plurality of beams of RF signals, concurrently transmitted by the master RF device, i.e. the base station 104, in a same RF band over the entire distributed transceivers in the RF device network.

A plurality of radio signal paths, such as the first radio signal path 110A, the second radio signal path 110B, the third radio signal path 110C, the fourth radio signal path 110D, the fifth radio signal path 110E, and the sixth radio signal path 110F, may correspond to various paths of propagation of a beam of RF signals that is obscured (partially or completely) by physical objects. Such obstructing physical objects make it difficult for the RF signal to pass through in a wireless communication network in a line-of-sight (LOS). Common physical objects between an RF transmitter device and an RF receiver device may include, for example, tall buildings, tinted glass, doors, walls, trees, physical landscape, and high-voltage power conductors. The plurality of radio signal paths may be facilitated by various wireless communication standards, such as, but not limited to, IEEE 802.11n (Wi-Fi), IEEE 802.11ac (Wi-Fi), HSPA+ (3G), WiMAX (4G), and Long Term Evolution (4G), 5G, power-line communication for 3-wire installations as part of ITU G.hn standard, and HomePlug AV2 specification. In accordance with an embodiment, the wireless communication network may facilitate extremely high frequency (EHF), which is the band of radio frequencies in the electromagnetic spectrum from 30 to 300 gigahertz. Such radio frequencies have wavelengths from ten to one millimeter, referred to as millimeter wave (mmWave).

In operation, the RF transmitter device, for example the base station 104, as the master RF device, may be configured to transmit the plurality of beams of RF signals to the RF receiver device, for example the CPE 106. As the base station 104 and the CPE 106 are in not in the LOS radio path, the base station 104 may be required to determine an optimized NLOS radio path out of the available NLOS radio paths for the transmission of the plurality of beams of RF signals.

Specifically, for such RF transmission to the CPE 106, the base station 104 may be configured to locate and dynamically select one or more reflector devices, such as the first active reflector device 102A, the first passive reflector device 102B, the second passive reflector device 102C, and the second active reflector device 102D, from the plurality of reflector devices 102 along the NLOS radio path based on a defined criteria. The defined criteria for the dynamic selection of the one or more reflector devices corresponds to a location of the one or more reflector devices, a relative distance of the one or more reflector devices with respect to the RF transmitter device, a type of one or more physical obstructing objects, and one or more parameters measured at the one or more reflector devices. The one or more parameters correspond to at least an antenna gain, a signal-to-noise ratio (SNR), a signal-to-interference-plus-noise ratio (SINR), a carrier-to-noise (CNR), and a carrier-to-interference-and-noise ratio (CINR).

Based on the defined criteria, the controller 104A of the base station 104 dynamically selects, configures, and manages operations of the entire distributed transceivers (corresponding to the base station 104, the CPE 106, and one or more reflector devices in the RF device network). Accordingly, the controller 104A determines the NLOS path that is the fastest and shortest RF path between the base station 104 and the CPE 106. In accordance with an exemplary instance, the NLOS path may be determined based on a shortest path algorithm.

In an exemplary scenario, the base station 104 may locate the first active reflector device 102A partially obstructed by a tree. As the first active reflector device 102A is capable of adjusting the amplitude gain and phase shift of the incoming plurality of beams of RF signals, and the relative distance between the base station 104 and the first active reflector device 102A is the least as compared to other reflector devices, the base station 104 may select the first active reflector device 102A for the transmission of the plurality of beams of RF signals. The base station 104 and the first active reflector device 102A are associated via the first radio signal path 110A. Thus, the base station 104 may consider the first radio signal path 110A in the NLOS radio path.

Next, the base station 104 may determine that the selected first active reflector device 102A is further associated with the first passive reflector device 102B and the second passive reflector device 102C via the fifth radio signal path 110E and the second radio signal path 110B, respectively. The base station 104 may determine that the relative distance between the first active reflector device 102A and the first passive reflector device 102B is less than the relative distance between the first active reflector device 102A and the second passive reflector device 102C. However, as the first passive reflector device 102B is in vicinity of the external source of RF interference, such as the TV station 112, the base station 104 may select the second passive reflector device 102C and reject the first passive reflector device 102B. As the first passive reflector device 102B is rejected, the base station 104 may only consider the second radio signal path 110B in the NLOS radio path in addition to the first radio signal path 110A.

The base station 104 may further determine that the second passive reflector device 102C is further associated with the second active reflector device 102D via the third radio signal path 110C. The base station 104 may determine that the relative distance between the second active reflector device 102D and the second passive reflector device 102C is least than the others of the plurality of reflector devices 102. The base station 104 may select the second active reflector device 102D and consider the third radio signal path 110C in the NLOS radio path in addition to the first radio signal path 110A and the second radio signal path 110B.

The base station 104 may further determine that the second active reflector device 102D is further associated with the CPE 106 via the fourth radio signal path 110D. The base station 104 may determine that the relative distance between the second active reflector device 102D and the second passive reflector device 102C is least than the others of the plurality of reflector devices 102. Further, the second active reflector device 102D may adjust the amplitude gain and the phase shift of the plurality of beams of RF signals received from the second passive reflector device 102C, due to which the plurality of beams of RF signals may be transmitted through the tinted glass window of the customer premises 108. Thus, the base station 104 may select the second active reflector device 102D and consider the fourth radio signal path 110D in the NLOS radio path in addition to the first radio signal path 110A, the second radio signal path 110B, and the third radio signal path 110C.

In this manner, the base station 104 selects the first active reflector device 102A, the second passive reflector device 102C, and the second active reflector device 102D for transmission of the plurality of beams of RF signals from the base station 104 to the CPE 106 via the NLOS radio path, which comprises the first radio signal path 110A, the second radio signal path 110B, the third radio signal path 110C, and the fourth radio signal path 110D.

It may be noted the selection of the one or more reflector devices and the determination of the NLOS radio path, in the above exemplary scenario may be based on the shortest distance, presence of interference sources, and type of obstructing physical object. However, it should not the construed to be limiting the scope of the disclosure. Notwithstanding, the selection of the one or more reflector devices, and the determination of the NLOS radio path may be further based on other parameters, such as antenna gain, QoS, SNR, SINR, CNR, CINR, and the like, without deviation from the scope of the disclosure.

The base station 104 may be further configured to control the dynamically selected one or more reflector devices, i.e. the first active reflector device 102A, the second passive reflector device 102C, and the second active reflector device 102D, based on one or more conditions. A first condition of the one or more conditions may correspond to a transmission of the plurality of beams of RF signals through a plurality of physical obstructing objects (such as the wall of the customer premises 108). A second condition of the one or more conditions may correspond to determination of an optimized NLOS radio path, as described above, for the transmission of the plurality of beams of RF signals to the RF receiver device. The optimized NLOS radio path may correspond to an optimum or optimal characteristics for example, shortest radio path, optimum signals level, maximum bitrate, increased access speed, highest throughput, and the like, between the base station 104 and the CPE 106. The optimized NLOS radio path may further correspond to a guaranteed transmission of the plurality of beams of RF signals to the CPE 106.

In accordance with an embodiment, the determined NLOS radio path (for example, the combination of the first radio signal path 110A, the second radio signal path 110B, the third radio signal path 110C, and the fourth radio signal path 110D) may be optimal at a specific time instant "t1". However, due to one or more factors, such as a sudden presence of a high-voltage power conductor source, the determined NLOS radio path may be blocked and may not be optimal at a subsequent time instant "t2" (here, "t2">"t1"). In such a case, the base station 104 may be configured to dynamically detect the scenario, and may dynamically switch to an alternative next optimal path in in real-time or near real-time.

In accordance with another embodiment, one or more reflector devices in one of the determined optimal NLOS radio path (for example, the combination of the first radio signal path 110A, the second radio signal path 110B, the third radio signal path 110C, and the fourth radio signal path 110D) may develop an operational fault. In such a case, the base station 104 may be configured to detect the defective reflector device and, if not able to troubleshoot (diagnose, analyze, and/or otherwise determine condition of) the defective reflector device, the base station 104 may switch to an alternative reflector device and thereby dynamically determines another optimal NLOS radio path in real-time or near real-time.

Once the optimal NLOS radio path is determined, the array of distributed transmitters (or an array of distributed transceivers), which corresponds to various RF devices over the optimal NLOS radio path, utilize various transmission schemes, such as MIMO transmission, for RF communication. Accordingly, the plurality of beams of RF signals are transmitted from the base station 104 to the CPE 106, via the first active reflector device 102A, the second passive reflector device 102C, and the second active reflector device 102D, in the most optimal manner exhibiting high network performance and maximum network coverage.

With reference to FIG. 1, a combination of the various dynamically selected one or more reflector devices, for example, the first active reflector device 102A, the first active reflector device 102A and the second active reflector device 102D, and passive reflector devices, for example the first passive reflector device 102B and the second passive reflector device 102C, may form a multi-beam antenna array network. An RF range of such multi-beam antenna array network is extended due to the dynamic selection of the one or more reflector devices based on a defined criteria and control of the dynamically selected one or more reflector devices based on one or more conditions, as explained above.

Based on the above description, a multi-beam antenna array network of a plurality of active and passive reflector devices, for example, the first active reflector device 102A, the second passive reflector device 102C, and the second active reflector device 102D, may be implemented to extend RF signal range for an optimized NLOS radio path (for example, the combination of the first radio signal path 110A, the second radio signal path 110B, the third radio signal path 110C, and the fourth radio signal path 110D). In an exemplary scenario, an instance of the multi-beam antenna array network may provide an extended coverage of RF signals at home. As the data paths associated with the modems are eliminated, the RF signal latency is eliminated.

It may be noted that the above description of the optimized NLOS radio path in an RF device network with an extended range may facilitate various exemplary operations, such as smart beam forming and antenna diversity. It may be further noted that the above description is with respect to an embodiment, in accordance to which the intelligence is incorporated in the base station 104 to select and control the one or more reflector devices. However, the disclosure may not be so limiting, and without deviation from the scope of the disclosure, such intelligence may be incorporated in other fixed devices, such as a central server, or as an app in a portable device associated with a user. In such cases, the user may have the control to configure the RF device network manually to select a combination of active and passive reflector devices for various locations and control the combination of active and passive reflector devices. Thus, the aforesaid exemplary operations may be performed at one or more phases of network configuration, such as installation, maintenance, operation, and troubleshooting, and the like.

FIG. 2 illustrates an exemplary passive reflector device with respect to a base station and a CPE, in accordance with an exemplary embodiment of the disclosure. With reference to FIG. 2, there is shown an exemplary passive reflector device (such as the second passive reflector device 102C), the base station 104, and the CPE 106.

With reference to FIG. 2, distance between the CPE 106 and the second passive reflector device 102C may be indicated by "D1". The scan angle may be indicated by "θ" and the incident angle of the second passive reflector device 102C may be indicated by "α". Accordingly, the size, indicated by "A1", of the second passive reflector device 102C may be determined based on equation (1) as follows:

$$A1 = D1 * \sin(\theta)/\sin(\alpha) \tag{1}$$

In an exemplary instance, if the scanning angle "θ" is "30 degree", the distance "D1" between the CPE 106 and the second passive reflector device 102C is "10 meter", and the incident angle "α" is "45 degree", then the reflector size "A1" may be calculated, based on the equation (1), as "7.1 meter". In another exemplary instance, if the scanning angle "θ" is "30 degree", the distance "D1" between the CPE 106 and the second passive reflector device 102C is "1 meter", and the incident angle "α" is "45 degree", then the reflector size "A1" may be calculated, based on the equation (1), as "71 centimeter". In yet another exemplary instance, if the scanning angle "θ" is "3 degree", the distance "D1" between the CPE 106 and the second passive reflector device 102C is "10 meter", and the incident angle "α" is "45 degree", then the reflector size "A1" may be calculated, based on the equation (1), as "74 centimeter".

FIG. 3 illustrates a block diagram of an exemplary multi-beam active reflector device, in accordance with an exemplary embodiment of the disclosure. With reference to FIG. 3, block diagram 300 shows the base station 104, the controller 104A, the CPE 106, and a multi-beam active reflector device 302. The multi-beam active reflector device 302 may be similar to the first active reflector device 102A and the second active reflector device 102D, as shown in FIG. 1. RF devices, such as the base station 104 and the CPE 106, may further comprise different instances of various components, such as a baseband processor 308, a memory 310, a plurality of distributed transceivers 312, and antenna arrays 314. More specifically, the base station 104 comprises a first instance, such as a baseband processor 308A, a memory 310A, a plurality of distributed transceivers 312A, and antenna arrays 314A, of such components. Similarly, the CPE 106 comprises a second instance, such as a baseband processor 308B, a memory 310B, a plurality of distributed transceivers 312B, and antenna arrays 314B, of such components.

With reference to FIG. 3, the multi-beam active reflector device 302 may include a first antenna array 304 and a second antenna array 306. The first antenna array 304 at a transmitter chip may be configured to transmit a first set of beams of RF signals (from the plurality of beams of RF signals) to at least the base station 104 and the CPE 106. The second antenna array 306 at a receiver chip may be configured to receive a second set of beams of RF signals (from the plurality of beams of RF signals) from at least the base station 104 and the CPE 106. Notwithstanding, the disclosure may not be so limited and without deviation from the scope of the disclosure, the first antenna array 304 may be further configured to transmit the first set of beams of RF signals to other reflector devices. Likewise, the second antenna array 306 may be further configured to receive the second set of beams of RF signals from other reflector devices. In accordance with an embodiment, the transmission of the first set of beams of RF signals to at least the RF transmitter device and the RF receiver device, via distributed transmitters, such as a set of distributed transmitters 302A communicatively coupled with the first antenna array 304, may be in accordance with MIMO transmission. Further, the reception of the second set of beams of RF signals from at least the RF transmitter device and the RF receiver device, via distributed receivers, such as a set of distributed receivers 302B communicatively coupled with the second antenna array 306, may be in accordance with MIMO reception.

In accordance with an embodiment, the count of beams of RF signals transmitted and received by the multi-beam active reflector device 302 is based on the size of the first antenna array 304 and the second antenna array 306, number of antenna modules at the transmitter and the receiver chips, and the hardware configuration of the multi-beam active reflector device 302. The first antenna array 304 and the second antenna array 306 of the multi-beam active reflector device 302 may be programmable and may be dynamically controlled by the base station 104, a central device server, one of the one or more reflector devices, or a mobile device.

In accordance with an embodiment, signal strength of a beam of RF signals transmitted by the first antenna array 304 is typically higher than signal strength of a beam of RF signal received by the second antenna array 306 at the multi-beam active reflector device 302. As such, the received beam of RF signals at the second antenna array 306 may be susceptible to interference from the transmitted beam of RF signals by the first antenna array 304. Therefore, to limit the interference, isolation is provided between the transmitter and the receiver chip in the multi-beam active reflector device 302.

The baseband processor 308 may comprise suitable logic, circuitry, interfaces and/or code that may be configured to perform baseband digital signal processing required for transmission and receiving operation of the plurality of distributed transceivers 312. In accordance with an embodiment, the baseband processor 308A may generate a plurality of MIMO coded data streams at baseband, to be transmitted to other RF devices. In accordance with another embodiment, the baseband processor 308B may receive the plurality of MIMO coded data streams at baseband, transmitted by other RF devices. The baseband processor 308 may be configured to perform various processes, such as waveform generation, equalization, and/or packet processing, associated with the operation of the plurality of distributed transceivers 312. Further, the baseband processor 308 may be configured to configure, manage and control orientations of the plurality of distributed transceivers 312.

The memory 310 may comprise suitable logic, circuitry, interfaces and/or code that may be configured to store information, such as executable instructions and data, which may be utilized by the baseband processor 308 and/or other associated components. The memory 310 may comprise random access memory (RAM), read only memory (ROM), low latency nonvolatile memory, such as flash memory and/or other such electronic data storage.

The plurality of distributed transceivers 312 may comprise suitable logic, circuitry, interfaces and/or code that may be configured to enable an RF transmitter device, such as the base station 104, to concurrently communicate each of MIMO coded data streams in same RF band to/from the RF receiver device, such as the CPE 106, through associated antenna arrays 314. Each distributed transceiver may be equipped with an independently configurable antenna or an antenna array configured to transmit and receive RF signals over the air, via the NLOS radio path.

In accordance with an embodiment, the plurality of distributed transceivers 312 may be implemented in various ways, such as a single distributed transceiver integrated in a single chip package, multiple silicon dies on one single chip, and multiple distributed transceivers on a single silicon die. Based on device capabilities and user preferences, the plurality of distributed transceivers 312 may be oriented in a fixed direction or different directions. In accordance with another embodiment, the plurality of distributed transceivers 312 may be configured to receive and/or transmit the plurality of beams of RF signals from and/or to the CPE 106 using air interface protocols specified in Universal Mobile Telecommunications Service (UMTS), Global System for Mobile Communications (GSM), Long-Term Evolution (LTE), wireless local area network (WLAN), 60 GHz/mmWave, and/or Worldwide Interoperability for Microwave Access (WiMAX).

The antenna arrays 314 may comprise suitable logic, circuitry, interfaces and/or code that may be configured to transmit/receive the plurality of beams of RF signals over the air, via the NLOS radio path, under the control of the plurality of distributed transceivers 312 and the baseband processor 308. Antennas of each of the antenna arrays 314 may be arranged at different directions or orientations based on antenna types, user preferences, and/or corresponding communication environment information.

In operation, due to the ability to adjust amplitude gain and phase shift, the multi-beam active reflector device 302 is selected that is positioned in a vicinity of a physical obstructing object that partially blocks or impairs a beam of RF signals. For example, as illustrated in FIG. 1, due to a presence of a first partial object, such as a tree, the first active reflector device 102A (which is similar to the multi-beam active reflector device 302) is selected by the base station 104. The first active reflector device 102A is positioned at a location such that it is visible from both ends of an obstructed radio path. For example, the first active reflector device 102A is partially visible from the base station 104 and completely visible from the first passive reflector device 102B and the second passive reflector device 102C as well.

In accordance with an embodiment, the first antenna array 304 and the second antenna array 306 of the multi-beam active reflector device 302 may include a primary sector which may form an area of the plurality of beams of RF signals of each antenna. The primary sector may transect an angle which includes an LOS path to each of the ends, i.e. the base station 104, the first passive reflector device 102B and the second passive reflector device 102C, of the radio path. The RF signals of the multi-beam active reflector device 302 which are directed most closely in the direction of the selected ends of the radio path are selected and connected together as a beam. One or more splitters may split the RF signals into the respective beams for amplification in the power amplifiers for active reflections. In accordance with an embodiment, the multi-beam active reflector device 302 may also operate as passive reflectors in case the amplification of the beams of RF signals is not performed. The use of the multi-beam active reflector device 302 as an active or passive reflector may provide a simpler, compact, and more versatile network system than using a plurality of antennas, which are mounted and positioned individually to point towards their respective ends of the radio path.

Once the optimal NLOS radio path is determined, the plurality of distributed transceivers 312, which corresponds to various RF devices over the optimal NLOS radio path, utilize various transmission schemes, such as MIMO transmission, for RF communication. Accordingly, the plurality of beams of RF signals are transmitted from the base station 104 to the CPE 106, via the multi-beam active reflector device 302, in the most optimal manner exhibiting high network performance and maximum network coverage.

During the MIMO transmission, the baseband processor 308A may encode the data streams in the baseband based on various coding algorithms, such as space-time coding or space-time-frequency coding. The coded data streams in the baseband may be initially converted into different corresponding intermediate frequency (IF) bands and then may be further up-converted to the same RF band. The baseband processor 308A may be configured to enable transmit beamforming for the MIMO transmission. Accordingly, each of the coded data stream in the same RF band, as the plurality of beams of RF signals, may be concurrently transmitted, via the antenna arrays 314A, at different directions or orientations over the plurality of distributed transceivers 312A of the base station 104 to the CPE 106, via the multi-beam active reflector device 302 over the determined NLOS.

In accordance with an embodiment, the baseband processor 308A, in conjunction with the controller 104A, may continuously monitor and collect corresponding communication environment information, such as propagation environment conditions, link quality, device capabilities, locations, target throughput, and/or application QoS requirements reported from the CPE 106. The controller 104A may be configured to control the dynamically selected one or more reflector devices based on a feedback channel (not shown) that may be utilized to exchange and negotiate system configurations, such as number of transceivers within RF devices, number of antennas per transceivers, antenna beamformers, channel responses, sequence of antenna array coefficients being evaluated, and/or locations of at least the one or more reflector devices. The antenna arrays 314B in the CPE 106 may receive the plurality of beams of RF signals. The plurality of distributed transceivers 312B may communicate the received plurality of beams of RF signals, after down-conversion, to the baseband processor 308B.

Figure 4:
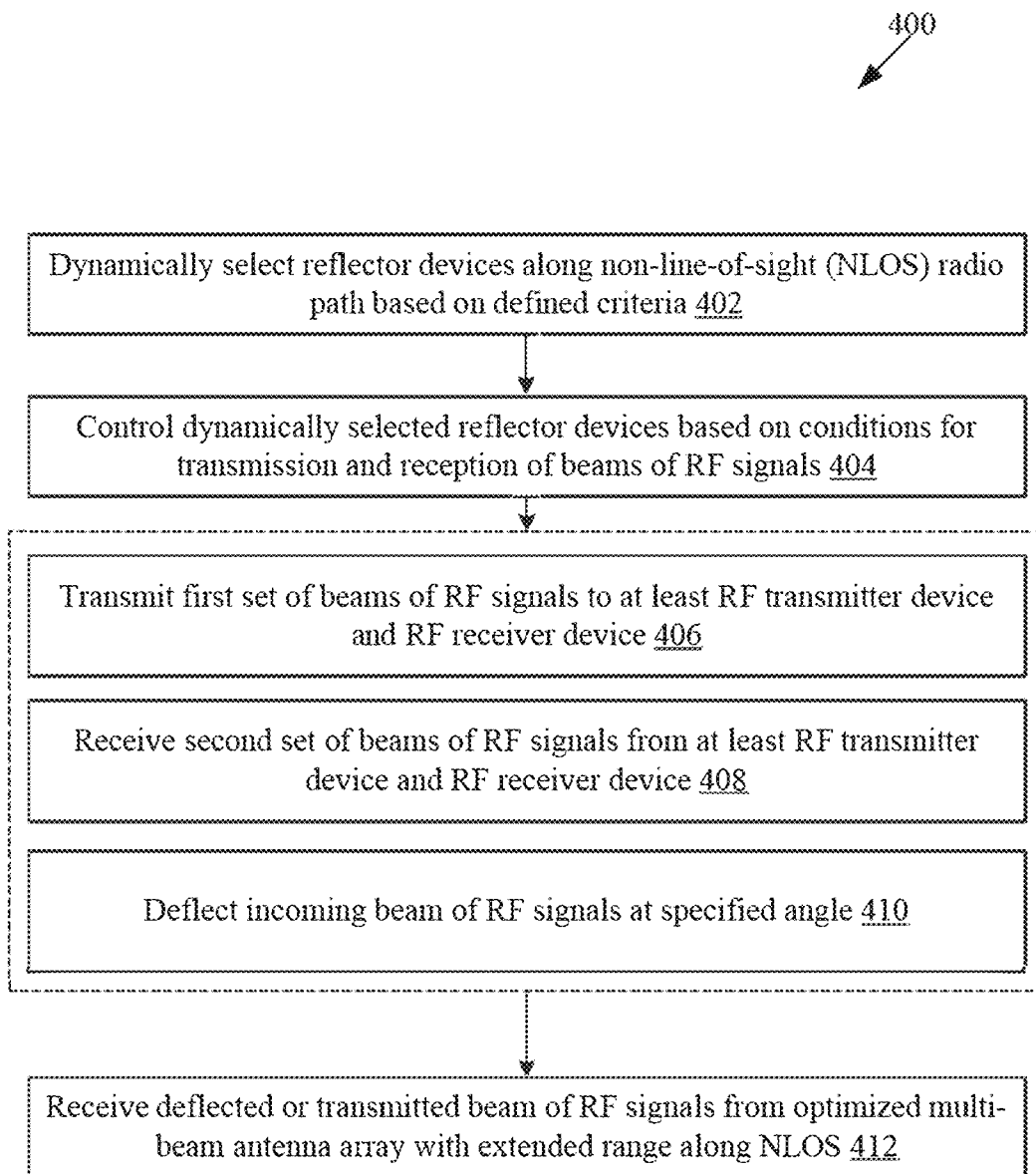
FIG. 4 depicts a flow chart illustrating exemplary operations for an exemplary system for an optimized multi-beam antenna array network with an extended RF range, in accordance with an exemplary embodiment of the disclosure.

FIG. 4 depicts a flow chart illustrating exemplary operations for an exemplary system for an optimized multi-beam antenna array network with an extended RF range, in accordance with an exemplary embodiment of the disclosure. The exemplary operations in FIG. 4 are explained in conjunction with FIGS. 1, 2, and 3. Referring to FIG. 4, there is shown a flow chart 400 comprising exemplary operations 402 through 412.

It may be noted that the sequence of exemplary operations, as described below at steps 406, 408, and 410, should not be construed to be limiting the scope of the disclosure. The sequence of exemplary operations is based on the sequence of the reflector devices (for example, a passive reflector device follows an active reflector device) in the one or more reflector devices that when traversed, provides an optimum NLOS path in the multi-antenna array network. Notwithstanding, for other sequences of exemplary operations, based on other sequences of the reflector devices (for example, an active reflector device follows a passive reflector device), the sequence of steps may vary (for example, 406 and 408 may follow step 410), without deviation from the scope of the disclosure. Furthermore, there may be another embodiment, according to which the multi-beam active reflector device 302 may simultaneously perform the steps 406, 408, and 410, without deviation from the scope of the disclosure.

At 402, the one or more reflector devices from the plurality of reflector devices may be located and dynamically selected along an NLOS radio path based on a defined criteria. In accordance with an embodiment, the one or more circuits, such as the controller 104A, in the base station 104 may be configured to locate and dynamically select one or more reflector devices, such as the first active reflector device 102A, the first passive reflector device 102B, the second passive reflector device 102C, and the second active reflector device 102D from the plurality of reflector devices 102 along an NLOS radio path based on a defined criteria. The base station 104, in conjunction with the GPS, may be configured to determine the location of the plurality of reflector devices.

At 404, the dynamically selected one or more reflector devices may be controlled based on one or more conditions for transmission and reception of the beams of RF signals. In accordance with an embodiment, the controller 104A in the base station 104 may be configured to control the dynamically selected one or more reflector devices, i.e. the first active reflector device 102A, the second passive reflector device 102C, and the second active reflector device 102D, based on one or more conditions. The dynamically controlled one or more reflector devices may operate to provide an optimized transmission and reception of a plurality of beams of RF signals by the selected one or more reflector devices. For example, a first condition of the one or more conditions may correspond to a transmission of the plurality of beams of RF signals through a plurality of physical obstructing objects (such as the wall of the customer premises 108). A second condition of the one or more conditions may correspond to determination of an optimized NLOS radio path, as described above, for the transmission of the plurality of beams of RF signals to the an RF receiver device, such as the CPE 106.

In accordance with an embodiment, the controller 104A in the base station 104 may be configured to detect a deviation of values of one or more parameters (for example, bitrate, throughput, access speed, and the like) of the NLOS radio path from the optimum values due to one or more sources of obstruction, such as presence of a high-voltage power conductor. Accordingly, the controller 104A may be configured to dynamically select a new NLOS radio path based on a determination that a current path is not an optimal path. However, in instance where the controller 104A subsequently determines that the new NLOS radio path is also not as optimum as the initial NLOS radio path, and meanwhile, the controller 104A performs troubleshooting and the source of obstruction has cleared, the controller 104A may be configured to dynamically switch back to the initial NLOS radio path in real-time or near real-time. The optimized NLOS radio path may correspond to a shortest and fastest radio path between the base station 104 and the CPE 106. The optimized NLOS radio path may further correspond to a guaranteed transmission of the plurality of beams of RF signals to the CPE 106 with an extended RF signal range for the optimized NLOS radio path.

Once the optimal NLOS radio path is determined, the plurality of distributed transceivers 312A, which corresponds to various RF devices over the optimal NLOS radio path, utilize various transmission schemes, such as the MIMO transmission, for RF communication. Accordingly, the plurality of beams of RF signals are transmitted from the base station 104 to the CPE 106, via the multi-beam active reflector device 302 for example, in the most optimal manner exhibiting high network performance and maximum network coverage.

During the MIMO transmission, the baseband processor 308A may encode the data streams in the baseband based on various coding algorithms, such as space-time coding or space-time-frequency coding. The coded data streams in the baseband may be initially converted into different corresponding IF bands and then may be further up-converted to the same RF band. The baseband processor 308A may be configured to enable transmit beamforming for the MIMO transmission. Accordingly, each of the coded data stream in the same RF band, as the plurality of beams of RF signals, may be concurrently transmitted, via the antenna arrays 314A, at different directions or orientations over the plurality of distributed transceivers 312A of the base station 104 to the CPE 106, via the multi-beam active reflector device 302 over the determined NLOS.

At 406, a first set of beams of RF signals may be transmitted to at least an RF transmitter device and an RF receiver device. In accordance with an embodiment, the first antenna array 304 may be configured to transmit a first set of beams of RF signals of the plurality of beams of RF signals to at least the RF transmitter device, i.e. the base station 104, and the RF receiver device, i.e. the CPE 106. In accordance with an embodiment, the first antenna array 304 may be configured to transmit the first set of beams of RF signals to other reflector devices, such as the second passive reflector device 102C, of the dynamically selected one or more reflector devices. The transmission of the first set of beams of RF signals to at least the RF transmitter device and the RF receiver device, via distributed transmitters, such as the set of distributed transmitters 302A communicatively coupled with the first antenna array 304, may be in accordance with the MIMO transmission.

At 408, a second set of beams of RF signals may be received from at least an RF transmitter device and an RF receiver device. In accordance with an embodiment, the second antenna array 306 may be configured to receive a second set of beams of RF signals from the RF transmitter device, i.e. the base station 104, and the RF receiver device, i.e. the CPE 106. The second antenna array 306 may be further configured to receive the second set of beams of RF signals from other devices, such as the second passive reflector device 102C, of the dynamically selected one or more reflector devices. The reception of the second set of beams of RF signals from at least the RF transmitter device and the RF receiver device, via distributed receivers, such as the set of distributed receivers 302B communicatively coupled with the second antenna array 306, may be in accordance with the MIMO reception.

At 410, an incoming beam of RF signals may be deflected at a specified angle. In accordance with an embodiment, the first passive reflector device 102B and the second passive reflector device 102C may be configured to provide only a deflection to the plurality of beams of RF signals without adjusting the amplitude gain and the phase shift of the plurality of beams of RF signals. The first passive reflector device 102B and the second passive reflector device 102C may provide the deflection based on various parameters, such as an incident angle, scan angle, and sizes of the first passive reflector device 102B and the second passive reflector device 102C. The first passive reflector device 102B and the second passive reflector device 102C may be positioned in a vicinity of a physical obstructing object, such as a building, that may completely block the path of the plurality of beams of RF signals. The first passive reflector device 102B and the second passive reflector device 102C may be arranged at an incident angle, so that the angle of incoming plurality of beams of RF signals corresponds to the angle of the outgoing plurality of beams of RF signals.

At 412, the deflected or the transmitted beam of RF signals from an optimized multi-beam antenna array network (with extended range along the NLOS) may be received. In accordance with an embodiment, the RF receiver device, such as the CPE 106, may be configured to receive the beam of RF signals deflected or transmitted by an optimized multi-beam antenna array network (with extended range along NLOS). In accordance with an embodiment, the RF receiver device may be a reflector device from the one or more reflector devices. In accordance with yet another embodiment, the RF receiver device may be the base station 104.

In accordance with an embodiment, the antenna arrays 314B in the CPE 106 may receive the plurality of beams of RF signals. The plurality of distributed transceivers 312B may communicate the received plurality of beams of RF signals, after down-conversion, to the baseband processor 308B.

Figure 5:
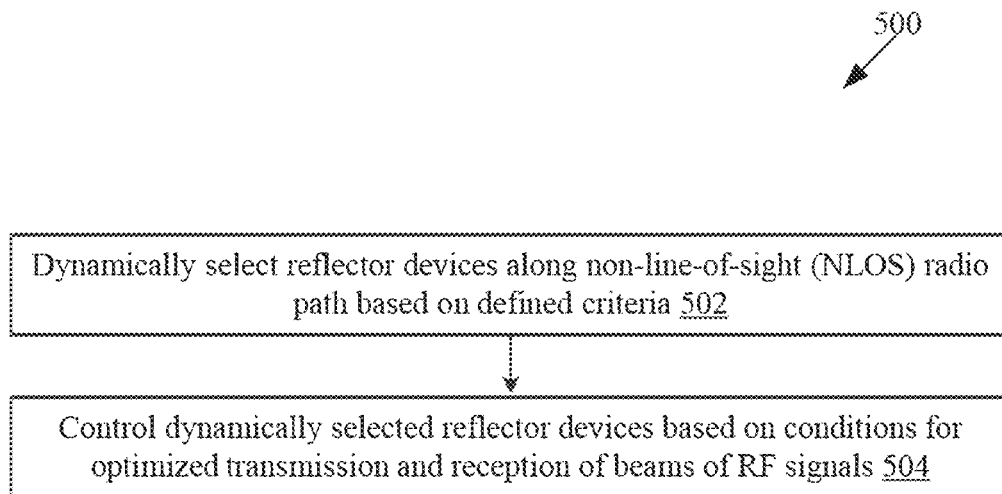
FIG. 5 depicts a flow chart illustrating exemplary operations for an exemplary electronic equipment for an optimized multi-beam antenna array network with an extended RF range, in accordance with an exemplary embodiment of the disclosure.

FIG. 5 depicts a flow chart illustrating exemplary operations for an exemplary electronic equipment for an optimized multi-beam antenna array network with an extended RF range, in accordance with an exemplary embodiment of the disclosure. The exemplary operations in FIG. 5 are explained in conjunction with FIGS. 1, 2, and 3. Referring to FIG. 5, there is shown a flow chart 500 comprising exemplary operations 502 through 504.

It may be noted that FIG. 5 is explained based on the assumption that the base station 104 comprises one or more circuits, such as the controller 104A, the baseband processor 308A, the memory 310A, the plurality of distributed transceivers 312A, and the antenna arrays 314A, configured to dynamically perform the following exemplary operations 502 through 504. However, it should not to be construed to be limiting the scope of the disclosure, and the same intelligence may be incorporated in external fixed devices (such as a central server), the one or more reflector devices, or mobile devices that are associated with a user. In case of a mobile device, an app may be installed and executed to facilitate the configuration of the RF device network manually for selection of a combination of active and passive reflector devices for various locations. The app may further facilitate the combination of active and passive reflector devices.

At 502, the one or more reflector devices from the plurality of reflector devices may be located and dynamically selected along an NLOS radio path based on a defined criteria. In accordance with an embodiment, the one or more circuits, such as the controller 104A, in the base station 104 may be configured to dynamically select one or more reflector devices, such as the first active reflector device 102A, the first passive reflector device 102B, the second passive reflector device 102C, and the second active reflector device 102D, from the plurality of reflector devices 102 along an NLOS radio path based on the defined criteria. The defined criteria is described in detail in FIG. 1. The base station 104, in conjunction with the GPS, may be configured to determine the location of each of the plurality of reflector devices 102.

At 504, the dynamically selected one or more reflector devices may be controlled based on one or more conditions for transmission and reception of the beams of RF signals. In accordance with an embodiment, the controller 104A in the base station 104 may be configured to control the dynamically selected one or more reflector devices, i.e. the first active reflector device 102A, the second passive reflector device 102C, and the second active reflector device 102D, based on one or more conditions. The dynamically controlled one or more reflector devices may operate to provide an optimized transmission and reception of a plurality of beams of RF signals by the selected one or more reflector devices. For example, a first condition of the one or more conditions may correspond to a transmission of the plurality of beams of RF signals through a plurality of physical obstructing objects (such as the wall of the customer premises 108). A second condition of the one or more conditions may correspond to determination of an optimized NLOS radio path, as described above, for the transmission of the plurality of beams of RF signals to the an RF receiver device, such as the CPE 106.

In accordance with an embodiment, the controller 104A may be configured to control the dynamically selected one or more reflector devices based on a feedback channel (not shown) that may be utilized to exchange and negotiate system configurations, such as number of transceivers within RF devices, number of antennas per transceivers, antenna beamformers, channel responses, sequence of antenna array coefficients being evaluated, and/or locations of at least the one or more reflector devices.

In accordance with an embodiment, the controller 104A in the base station 104 may be configured to monitor various parameters, such as bitrate, throughput, access speed, and the like, of the NLOS radio path. Based on a variation of the observed parameters with respect to optimum parameters, the controller 104A may be configured to detect one or more sources of obstruction that cause such variation. In case the controller 104A is not able to troubleshoot, a new NLOS radio path may be selected. In an exemplary instance, the controller 104A determines that the new NLOS radio path is not as optimum as the initial NLOS radio path. Meanwhile, the controller 104A performs troubleshooting and the source of obstruction is cleared. Accordingly, the controller 104A may be configured to dynamically switch back to the initial NLOS radio path in real-time or near real-time.

Various embodiments of the disclosure may provide a non-transitory computer-readable medium having stored thereon, computer implemented instruction that when executed by an RF transmitter device in an RF device network, execute operations to dynamically select one or more reflector devices from the plurality of reflector devices along an NLOS radio path based on a defined criteria. The dynamically selected one or more reflector devices may be controlled based on one or more conditions for transmission and reception of a plurality of beams of RF signals by the dynamically selected one or more reflector devices in the RF device network. An active reflector device in the dynamically selected one or more reflector devices may comprise at least a first antenna array and a second antenna array. The first antenna array may transmit a first set of beams of RF signals from the plurality of beams of RF signals to at least the RF transmitter device and the RF receiver device. The second antenna array may receive a second set of beams of RF signals from the plurality of beams of RF signals from at least the RF transmitter device and the RF receiver device.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A communication device comprising, comprising:
   an active reflector device, wherein the active reflector device comprises:
   a first antenna array configured to:
   transmit a first set of beams of radio frequency (RF) signals of a plurality of beams of RF signals to at least an RF transmitter device and an RF receiver device,
   wherein the RF transmitter device:
   configures system configurations based on at least one of environment information or link quality;
   selects one or more reflector devices from a plurality of reflector devices along a non-line-of-sight (NLOS) radio path based on the system configurations,
   wherein the plurality of reflector devices comprises the active reflector device and a passive reflector device, and
   wherein the RF receiver device receives the first set of beams of RF signals from the selected one or more reflector devices; and
   transmit the first set of beams of RF signals of the plurality of beams of RF signals to the passive reflector device, and
   a second antenna array configured to:
   receive a second set of beams of RF signals of the plurality of beams of RF signals from at least the RF transmitter device and the RF receiver device; and
   receive the second set of beams of RF signals of the plurality of beams of RF signals from the passive reflector device.

2. The communication device according to claim 1, wherein the active reflector device is configured to adjust an amplitude gain and phase shift of the first set of beams of RF signals of the plurality of beams of RF signals.

3. The communication device according to claim 1, wherein a first signal strength of a first beam of the first set of beams of RF signals transmitted by the first antenna array is higher than a second signal strength of a second beam of the second set of beams of RF signals received by the second antenna array.

4. The communication device according to claim 1, wherein the active reflector device is positioned at a distance from a second physical obstructing object that partially blocks or impair the first beam of RF signals.

5. The communication device according to claim 1, wherein the selection of the one or more reflector devices is based on at least one of a location of the one or more reflector devices, a relative distance of the one or more reflector devices with respect to the RF transmitter device, a type of one or more physical obstructing objects, or one or more parameters measured at the one or more reflector devices, and
   wherein the one or more parameters correspond to at least an antenna gain, a signal-to-noise ratio (SNR), a signal-to-interference-plus-noise ratio (SINR), a carrier-to-noise (CNR), or a carrier-to-interference-and-noise ratio (CINR).

6. The communication device according to claim 1, wherein the selected one or more reflector devices are controlled based on one or more conditions that correspond to transmission of the plurality of beams of RF signals through a plurality of physical obstructing objects and determination of an NLOS radio path with best performance for the transmission of the plurality of beams of RF signals to the RF receiver device.

7. The communication device according to claim 1, wherein the first antenna array and the second antenna array are isolated from each other.

8. The communication device according to claim 1, further comprising an electronic device configured to execute an application program for the selection of the one or more reflector devices from the plurality of reflector devices and control the selected one or more reflector devices, wherein the application program is executed for an installation, maintenance, control, and troubleshoot a system comprising a multi-beam antenna array network.

9. The communication device according to claim 8, wherein the multi-beam antenna array network comprises a combination of the active reflector device that includes the first antenna array and the second antenna array and the passive reflector device, and
   wherein an RF range of the multi-beam antenna array network is extended based on the selection of the one or more reflector devices and control of the selected one or more reflector devices.

10. The communication device according to claim 1, wherein the plurality of reflector devices are integrated in a package of a plurality of antenna modules of corresponding reflector device.

11. The communication device according to claim 1, wherein each of the plurality of reflector devices are on a printed circuit board on which a plurality of antenna modules of corresponding reflector device is mounted.

12. The communication device according to claim 1, wherein the active reflector device comprises one or more distributed circuits configured to transmit the first set of beams of the RF signals and receive the second set of beams of RF signals based on multiple-input multiple-output (MIMO) transmission and reception.

13. The communication device according to claim 1, wherein each of the RF transmitter device and the RF receiver device comprises a plurality of distributed transceivers, wherein the plurality of distributed transceivers is configured to transmit and receive the plurality of beams of RF signals based on multiple-input multiple-output (MIMO) transmission and reception.

14. A communication device, comprising:
  in an electronic equipment in a radio frequency (RF) device network, wherein the electronic equipment further comprises:
    an active reflector device, wherein the active reflector device comprises:
      a first antenna array configured to:
        transmit a first set of beams of radio frequency (RF) signals of a plurality of beams of RF signals to at least an RF transmitter device and an RF receiver device,
        wherein the RF transmitter device:
          configures system configurations based on at least one of environment information or link quality;
          selects one or more reflector devices from a plurality of reflector devices along a non-line-of-sight (NLOS) radio path based on the system configurations,
          wherein the plurality of reflector devices comprises the active reflector device and a passive reflector device, and
          wherein the RF receiver device receives the first set of beams of RF signals from the selected one or more reflector devices in the RF device network; and
          transmit the first set of beams of RF signals of the plurality of beams of RF signals to the passive reflector device, and
      a second antenna array configured to:
        receive a second set of beams of RF signals of the plurality of beams of RF signals from at least the RF transmitter device and the RF receiver device; and
        receive the second set of beams of RF signals of the plurality of beams of RF signals from the passive reflector device.

15. The communication device according to claim 14, wherein the electronic equipment corresponds to an RF transmitter device or a mobile electronic device.

16. The communication device according to claim 14, wherein the electronic equipment is further configured to control the selected one or more reflector devices based on information received via a feedback channel.

17. The communication device according to claim 16, wherein the information is associated with exchange and negotiate system configurations, wherein the information comprises at least one of a number of transceivers within one or more RF devices, number of antennas per transceiver, antenna beamformers, channel responses, sequence of antenna array coefficients evaluated, or locations of at least the one or more reflector devices.

18. The communication device according to claim 14, wherein the electronic equipment comprises a plurality of distributed transceivers.

19. The communication device according to claim 18, wherein the plurality of distributed transceivers is configured to transmit the plurality of beams of RF signals in accordance with multiple-input multiple-output (MIMO) transmission.

* * * * *